(12) United States Patent
Jean

(10) Patent No.: US 11,163,692 B2
(45) Date of Patent: *Nov. 2, 2021

(54) MEMORY CONSTRAINED TRANSLATION TABLE MANAGEMENT

(71) Applicant: Micron Technology, Inc., Boise, ID (US)

(72) Inventor: Sebastien Andre Jean, Meridian, ID (US)

(73) Assignee: Micron Technology, Inc., Boise, ID (US)

( * ) Notice: Subject to any disclaimer, the term of this patent is extended or adjusted under 35 U.S.C. 154(b) by 125 days.

This patent is subject to a terminal disclaimer.

(21) Appl. No.: 16/568,962

(22) Filed: Sep. 12, 2019

(65) Prior Publication Data

US 2020/0004689 A1   Jan. 2, 2020

Related U.S. Application Data

(63) Continuation of application No. 15/692,622, filed on Aug. 31, 2017, now Pat. No. 10,437,734.

(51) Int. Cl.
*G06F 12/1009* (2016.01)
*G06F 12/02* (2006.01)

(52) U.S. Cl.
CPC ...... *G06F 12/1009* (2013.01); *G06F 12/0246* (2013.01); *G06F 2212/1024* (2013.01); *G06F 2212/1044* (2013.01); *G06F 2212/7201* (2013.01)

(58) Field of Classification Search
CPC ......... G06F 12/1009; G06F 2212/7201; G06F 12/0246; G06F 2212/1024; G06F 2212/1044
See application file for complete search history.

(56) References Cited

U.S. PATENT DOCUMENTS

| 10,067,881 B2* | 9/2018 | Pham ................. G06F 12/0871 |
| 10,437,734 B2* | 10/2019 | Jean ................... G06F 12/0246 |
| 2015/0178010 A1 | 6/2015 | Chang et al. |
| 2019/0018788 A1 | 1/2019 | Yoshida et al. |
| 2019/0035437 A1 | 1/2019 | Zimmerman et al. |
| 2019/0065393 A1 | 2/2019 | Jean |

FOREIGN PATENT DOCUMENTS

CN    109426621 A    3/2019

* cited by examiner

*Primary Examiner* — Zhuo H Li
(74) *Attorney, Agent, or Firm* — Schwegman Lundberg & Woessner, P.A.

(57) ABSTRACT

Devices and techniques for memory constrained translation table management are disclosed herein. A level of a translation table is logically segmented into multiple segments. Here, a bottom level of the translation table includes a logical to physical address pairing for a portion of a storage device and other levels of the translation table include references within the translation table. The multiple segments are written to the storage device. A first segment of the multiple segments is loaded to byte-addressable memory. A request for an address translation is received and determined to be for an address referred to by a second segment of the multiple segments. The first segment is then replaced with the second segment in the byte-addressable memory and the request is fulfilled using the second segment to locate a lower level of the translation table that includes the address translation.

30 Claims, 9 Drawing Sheets

MEMORY CONSTRAINED TRANSLATION TABLE MANAGEMENT

PRIORITY APPLICATION

This application is a continuation of U.S. application Ser. No. 15/692,622, filed Aug. 31, 2017, which is incorporated herein by reference in its entirety.

BACKGROUND

Memory devices are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory devices typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data.

However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multi-level cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Traditional memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory devices, are being developed to further increase memory density and lower memory cost.

Such 3D NAND devices often include strings of storage cells, coupled in series (e.g., drain to source), between one or more source-side select gates (SGSs) proximate a source, and one or more drain-side select gates (SGDs) proximate a bit line. In an example, the SGSs or the SGDs can include one or more field-effect transistors (FETs) or metal-oxide semiconductor (MOS) structure devices, etc. In some examples, the strings will extend vertically, through multiple vertically spaced tiers containing respective word lines. A semiconductor structure (e.g., a polysilicon structure) may extend adjacent a string of storage cells to form a channel for the storages cells of the string. In the example of a vertical string, the polysilicon structure may be in the form of a vertically extending pillar. In some examples the string may be "folded," and thus arranged relative to a U-shaped pillar. In other examples, multiple vertical structures may be stacked upon one another to form stacked arrays of storage cell strings.

Memory arrays or devices can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.), SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs may include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
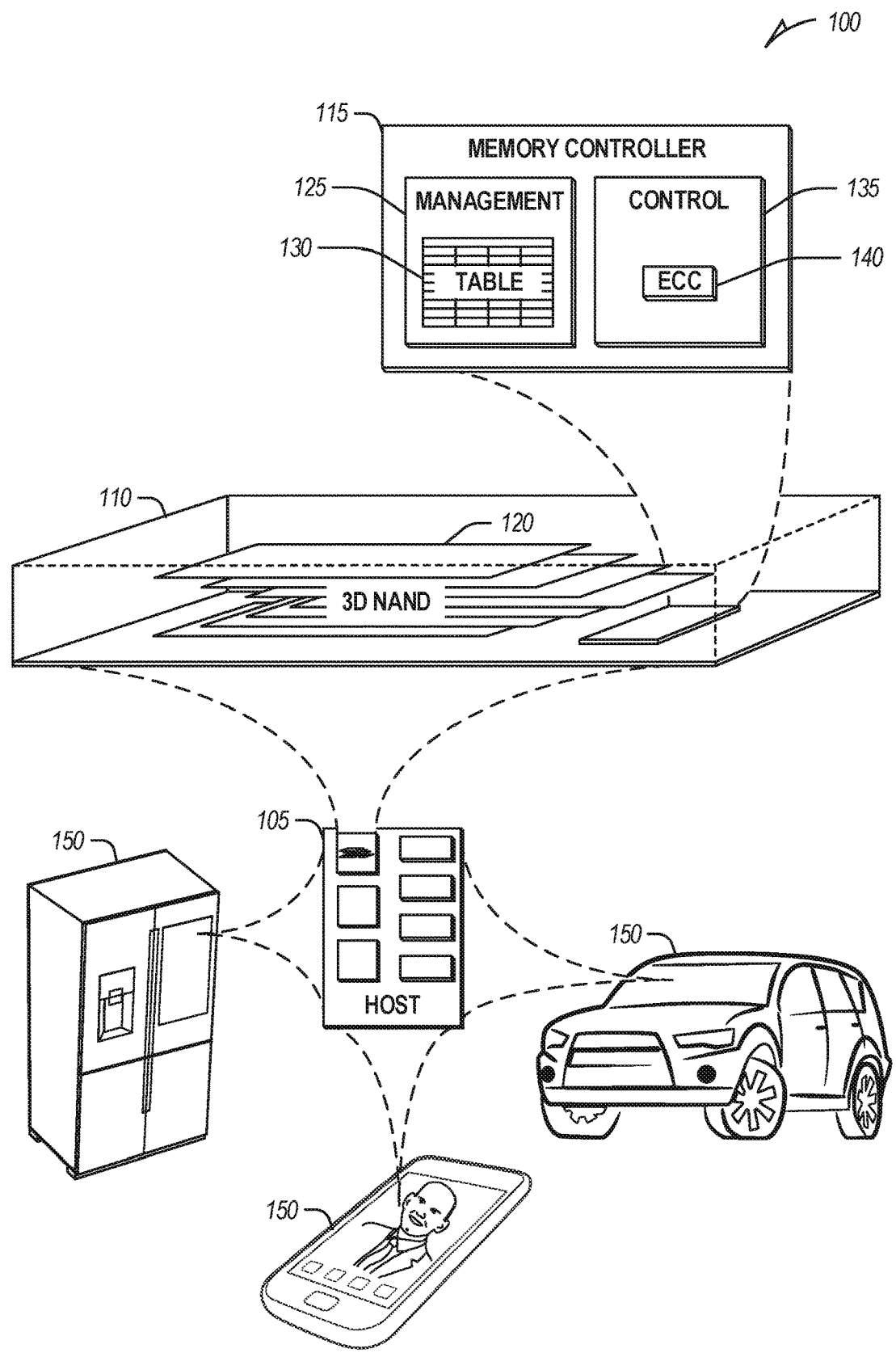
FIG. 1 illustrates an example of an environment including a memory device.

Many storage devices, such as flash devices, use translation tables to map logical elements (e.g., pages or blocks) to the physical equivalents of the logical elements. This allows the controller of the device to perform a variety of technique to increase the performance of, of longevity of, the storage elements of the device. For example, NAND flash cells experience physical where with write or erase cycles. Further, these devices require many elements to be erased at one time (e.g., block erasure). To address these issues, the controller generally spreads writes around available cells (e.g., to reduce wearing out of these cells) and migrates good pages from blocks to erase the block and thus free additional space. In both cases, a host address for a given page or block may be constant even though the data to which it refers is moved to different physical pages or blocks by virtue of the translation table.

Organization of translation tables is generally a multilevel scheme whereby a first, or top, level of the table has entries that refer to a lower-level of the table, whose entries in turn include the logical to physical mapping for an element. This organization is a relatively compact and efficient storage schema. For example, to translate a 32 gigabits of storage, the top-level may be as small as 32 kilobits, and the second level storage as small as 32 megabits.

Generally, the top-level of the translation table is cached in a fast memory, such as SRAM. Thus, the size of the fast memory often limits the size of the top-level of the translation table and thus the size of the storage that is mapped by the translation table. This entails ever increasing cache sizes for larger storage devices.

To address this issue, the various levels of the translation table, such as the top-level, may be segmented such that the translation table level may be partially cached on fast memory that is smaller than the table level. This permits the table organization to remain efficient while also addressing the problem of ever-growing cache sizes for large devices. The split-level table organization may be achieved by enforcing a write condition on table entries that permits efficient search for other segments of the table level. Thus, if the segment of a given level that is cached does not contain the data to complete the translation, its counterpart may be quickly retrieved to satisfy the translation. The write constraint may take many forms, such as requiring table levels to be written contiguously on the storage medium, including pointers between segments of the table level, or storing table level segments in specific places on the storage device permitting an efficient search by visiting these places. Additional details and examples are provided below.

Devices employing the translation table modifications discussed herein may fit in many applications. Electronic devices, such as mobile electronic devices (e.g., smart phones, tablets, etc.), electronic devices for use in automotive applications (e.g., automotive sensors, control units, driver-assistance systems, passenger safety or comfort systems, etc.), and internet-connected appliances or devices (e.g., internet-of-things (IoT) devices, etc.), have varying storage needs depending on, among other things, the type of electronic device, use environment, performance expectations, etc.

Electronic devices can be broken down into several main components: a processor (e.g., a central processing unit (CPU) or other main processor); memory (e.g., one or more volatile or non-volatile random-access memory (RAM) memory device, such as dynamic RAM (DRAM), mobile or low-power double-data-rate synchronous DRAM (DDR SDRAM), etc.); and a storage device (e.g., non-volatile memory (NVM) device, such as flash memory, read-only memory (ROM), an SSD, an MMC, or other memory card structure or assembly, etc.). In certain examples, electronic devices can include a user interface (e.g., a display, touchscreen, keyboard, one or more buttons, etc.), a graphics processing unit (GPU), a power management circuit, a baseband processor or one or more transceiver circuits, etc.

FIG. 1 illustrates an example of an environment 100 including a host device 105 and a memory device 110 configured to communicate over a communication interface. The host device 105 or the memory device 110 may be included in a variety of products 150, such as Internet of Things (IoT) devices (e.g., a refrigerator or other appliance, sensor, motor or actuator, mobile communication device, automobile, drone, etc.) to support processing, communications, or control of the product 150.

The memory device 110 includes a memory controller 115 and a memory array 120 including, for example, a number of individual memory die (e.g., a stack of three-dimensional (3D) NAND die). In 3D architecture semiconductor memory technology, vertical structures are stacked, increasing the number of tiers, physical pages, and accordingly, the density of a memory device (e.g., a storage device). In an example, the memory device 110 can be a discrete memory or storage device component of the host device 105. In other examples, the memory device 110 can be a portion of an integrated circuit (e.g., system on a chip (SOC), etc.), stacked or otherwise included with one or more other components of the host device 105.

One or more communication interfaces can be used to transfer data between the memory device 110 and one or more other components of the host device 105, such as a Serial Advanced Technology Attachment (SATA) interface, a Peripheral Component Interconnect Express (PCIe) interface, a Universal Serial Bus (USB) interface, a Universal Flash Storage (UFS) interface, an eMMC™ interface, or one or more other connectors or interfaces. The host device 105 can include a host system, an electronic device, a processor, a memory card reader, or one or more other electronic devices external to the memory device 110. In some examples, the host 105 may be a machine having some portion, or all, of the components discussed in reference to the machine 1000 of FIG. 10.

The memory controller 115 can receive instructions from the host 105, and can communicate with the memory array 120, such as to transfer data to (e.g., write or erase) or from (e.g., read) one or more of the memory cells, planes, sub-blocks, blocks, or pages of the memory array 120. The memory controller 115 can include, among other things, circuitry or firmware, including one or more components or integrated circuits. For example, the memory controller 115 can include one or more memory control units, circuits, or components configured to control access across the memory array 120 and to provide a translation layer between the host 105 and the memory device 110.

With respect to translation, the memory controller 115 may implement a split table level cache technique. Thus, the memory controller 115 is arranged to segment a level of the translation table into multiple segments. In an example, the level is a top level of the translation table. In an example, a bottom level of the translation table includes a logical to physical address pairing for a portion of the storage device 110 (e.g., such as a block or a page in the array 120). It is noted that the segmentation does not alter the logical relationships between elements or levels of the table. Thus, elements of the lowest level continue to map between a logical and physical address even if they are segmented, the overall tree-depth being unaffected by the segmentation.

The memory controller 115 may write the multiple segments to the storage device 110 (e.g., to the array 120). In an example, writing the multiple segments includes implementing a constraint on locations of the storage device 110 to which the multiple segments may be written. In an example, the constraint requires the locations of the storage device 110 to be contiguous (e.g., adjacent pages or blocks). In an example, more than one of the multiple segments are written to a smallest addressable portion of the storage device 110. In this example, for a typical NAND flash device, the smallest addressable portion is a page, however, blocks, planes, etc. may also be used in some devices. Constraining the write locations allows for an efficient retrieval of a segment. For example, if a second segment of the table portion contains data to complete a translation, a simple offset to the first segment's address may be used in the case of a contiguous write constraint.

In an example, the constraint corresponds to a physical attribute of the storage device 110. In an example, the physical attribute is a fixed page, block, or die that repeats within the storage device. In an example, the fixed page is a first page in a set of blocks, the block is a first block in a set of die, and the die is a first die in the NAND array. These constraints, like the contiguous constraint above, permit an efficient retrieval of additional segments for a table portion. Here, however, it may be more convenient for parallel operations, or other considerations, to have the multiple segments in different locations while still being easy to locate.

The memory controller 115 is arranged to load a first segment of the multiple segments to byte-addressable memory. Here, the memory controller 115 is caching the first segment. Byte-addressable memory is used here to distinguish between the cache memory and the storage memory, such as the array 120. Typically the byte-addressable memory is much faster than the storage memory and thus benefits system performance when frequently used data, such as the top-level of the translation table is cached.

In an example, loading the first segment of the multiple segments to the byte-addressable memory includes adding a pointer to the second segment to the byte-addressable memory. The pointer may be used to rapidly locate the second segment –n the future. In an example, loading the first segment of the multiple segments to the byte-addressable memory includes adding a second pointer to a third second segment of the multiple segments to the byte-addressable memory. This example illustrates a doubly linked list organization in which an entry may have a forward and a backward pointer. In an example, the multiple segments are ordered and the third segment precedes the first segment while the second segment follows the first segment. In an example, the pointer is the only pointer to another segment of the multiple segments. This example arises if the structure of the multiple segments has terminating (e.g., a first or a last) segments. In an example, all of the multiple segments are addressable by a respective pointer to form a ring data structure. The ring structure does not have terminating segments. In an example, the pointers may reside with the segments in the storage memory. In this example, the memory controller brings those pointers into the byte-addressable memory when the segments are loaded. This increase overhead to manage the pointers, but allows for great flexibility in locating the segments on the storage memory. In an example, the pointers are created by the memory controller 115 as the segments are located. For example, segments may be stored with an identifier that the memory controller 115 uses to identify a page, for example, as a memory segment. The memory control 115 may scan the array 120 at startup to identify the segments and store pointers to their respective locations when loaded into the byte-addressable memory.

The memory controller 115 is arranged to receive request for an address translation and to make a determination as to whether the request is for an address referred to by the first segment or a second segment of the multiple segments. If the request is for the first segment, the memory controller 115 proceeds perform the translation as it would traditionally. However, if the first segment does not have the translation information, the first segment is replaced with the segment that has that information, such as the second segment. Thus, the memory controller 115 is arranged to replace the first segment with the second segment in the byte-addressable memory. In an example, replacing the first segment with the second segment includes searching the fixed page, block, or die for the second segment. In an example, searching for the second segment includes comparing each repetition of the fixed page, block, or die until a translation table marker is found. These examples make use of the write constraints, pointers, or segment identification (e.g., maker) discussed above. It is at this time that the memory controller 115 performs the search for the missing segment, retrieves it, and uses it to perform the translation. Again, for a top-level table portion, this entails the memory controller 115 locating a lower level of the translation table that includes the address translation from the second segment, and return the physical element corresponding to the logical element.

The memory controller 115 can include one or more input/output (I/O) circuits, lines, or interfaces to transfer data to or from the memory array 120. The memory controller 115 can include a memory manager 125 and an array controller 135.

The memory manager 125 can include, among other things, circuitry or firmware, such as a number of components or integrated circuits associated with various memory management functions. For purposes of the present description example memory operation and management functions will be described in the context of NAND memory. Persons skilled in the art will recognize that other forms of non-volatile memory may have analogous memory operations or management functions. Such NAND management functions include wear leveling (e.g., garbage collection or reclamation), error detection or correction, block retirement, or one or more other memory management functions. The memory manager 125 can parse or format host commands (e.g., commands received from a host) into device commands (e.g., commands associated with operation of a memory array, etc.), or generate device commands (e.g., to accomplish various memory management functions) for the array controller 135 or one or more other components of the memory device 110.

The memory manager 125 can include a set of management tables 130 configured to maintain various information associated with one or more component of the memory device 110 (e.g., various information associated with a memory array or one or more memory cells coupled to the memory controller 115). For example, the management tables 130 can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The management tables 130 can maintain a count of correctable or uncorrectable bit errors, among other things.

The array controller 135 can include, among other things, circuitry or components configured to control memory operations associated with writing data to, reading data from, or erasing one or more memory cells of the memory device 110 coupled to the memory controller 115. The memory operations can be based on, for example, host commands received from the host 105, or internally generated by the memory manager 125 (e.g., in association with wear leveling, error detection or correction, etc.).

The array controller 135 can include an error correction code (ECC) component 140, which can include, among other things, an ECC engine or other circuitry configured to detect or correct errors associated with writing data to or reading data from one or more memory cells of the memory device 110 coupled to the memory controller 115. The memory controller 115 can be configured to actively detect and recover from error occurrences (e.g., bit errors, operation errors, etc.) associated with various operations or storage of data, while maintaining integrity of the data transferred between the host 105 and the memory device 110, or maintaining integrity of stored data (e.g., using redundant RAID storage, etc.), and can remove (e.g., retire) failing memory resources (e.g., memory cells, memory arrays, pages, blocks, etc.) to prevent future errors.

The memory array 120 can include several memory cells arranged in, for example, a number of devices, planes, sub-blocks, blocks, or pages. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

In operation, data is typically written to or read from the NAND memory device 110 in pages, and erased in blocks. However, one or more memory operations (e.g., read, write, erase, etc.) can be performed on larger or smaller groups of memory cells, as desired. The data transfer size of a NAND memory device 110 is typically referred to as a page, whereas the data transfer size of a host is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data.

Different types of memory cells or memory arrays 120 can provide for different page sizes, or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a multi-level cell (MLC) NAND flash device may have a higher bit error rate than a corresponding single-level cell (SLC) NAND flash device. As such, the MLC device may require more metadata bytes for error data than the corresponding SLC device.

Figure 2:
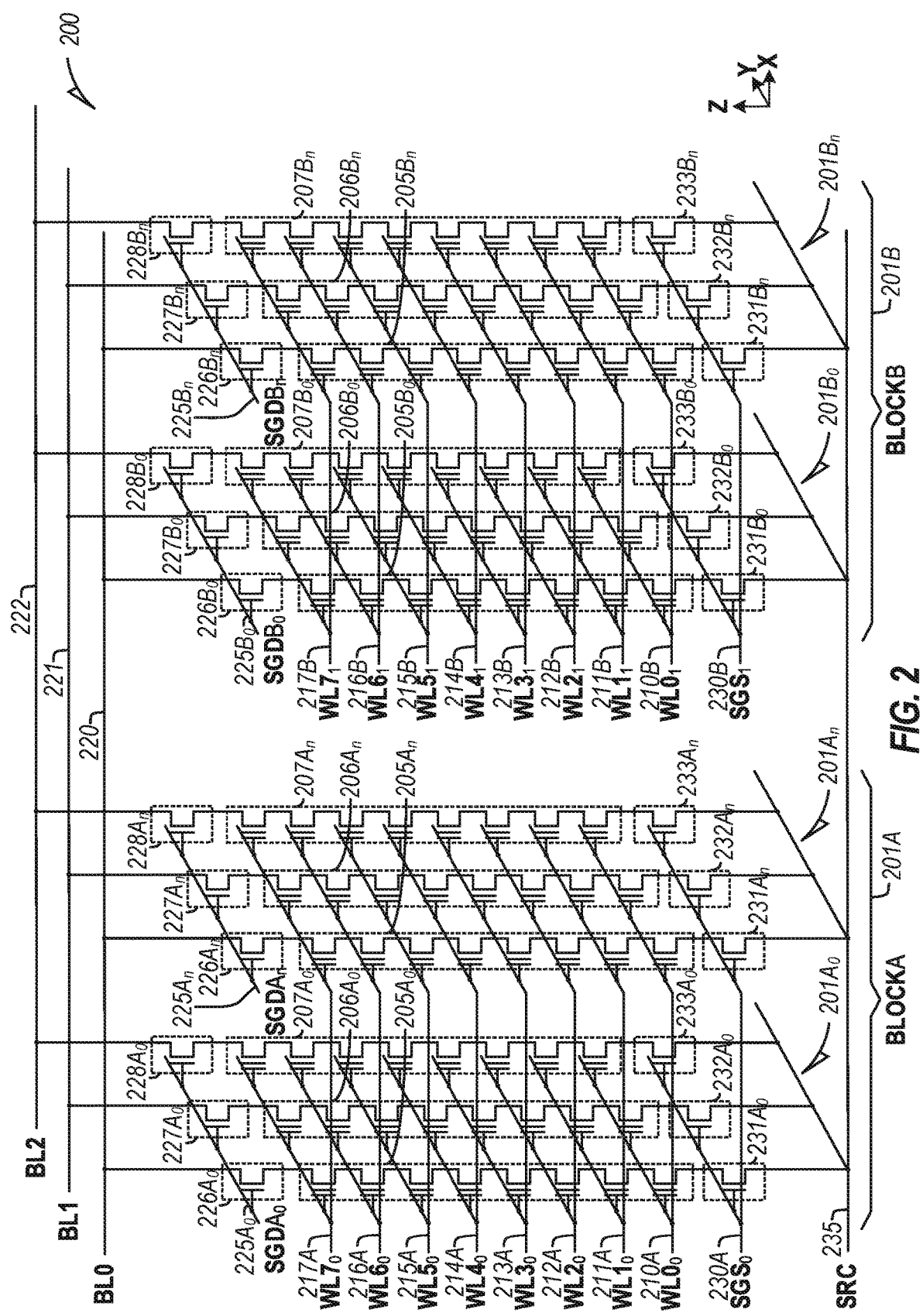
FIGS. 2-3 illustrate schematic diagrams of an example of a 3D NAND architecture semiconductor memory array.

FIG. 2 illustrates an example schematic diagram of a 3D NAND architecture semiconductor memory array 200 including a number of strings of memory cells (e.g., first-third $A_0$ memory strings $205A_0$-$207A_0$, first-third $A_n$ memory strings $205A_n$-$207A_n$, first-third $B_0$ memory strings $205B_0$-$207B_0$, first-third $B_n$ memory strings $205B_n$-$207B_n$, etc.), organized in blocks (e.g., block A 201A, block B 201B, etc.) and sub-blocks (e.g., sub-block $A_0$ $201A_0$, sub-block $A_n$ $201A_n$, sub-block $B_0$ $201B_0$, sub-block $B_n$ $201B_n$, etc.). The memory array 200 represents a portion of a greater number of similar structures that would typically be found in a block, device, or other unit of a memory device.

Each string of memory cells includes a number of tiers of charge storage transistors (e.g., floating gate transistors, charge-trapping structures, etc.) stacked in the Z direction, source to drain, between a source line (SRC) 235 or a source-side select gate (SGS) (e.g., first-third $A_0$ SGS $231A_0$-$233A_0$, first-third $A_n$ SGS $231A_n$-$233A_n$, first-third $B_0$ SGS $231B_0$-$233B_0$, first-third $B_n$ SGS $231B_n$-$233B_n$, etc.) and a drain-side select gate (SGD) (e.g., first-third $A_0$ SGD $226A_0$-$228A_0$, first-third $A_n$ SGD $226A_n$-$228A_n$, first-third $B_0$ SGD $226B_0$-$228B_0$, first-third $B_n$ SGD $226B_n$-$228B_n$, etc.). Each string of memory cells in the 3D memory array can be arranged along the X direction as data lines (e.g., bit lines (BL) BL0-BL2 220-222), and along the Y direction as physical pages.

Within a physical page, each tier represents a row of memory cells, and each string of memory cells represents a column. A sub-block can include one or more physical pages. A block can include a number of sub-blocks (or physical pages) (e.g., 128, 256, 384, etc.). Although illustrated herein as having two blocks, each block having two sub-blocks, each sub-block having a single physical page, each physical page having three strings of memory cells, and each string having 8 tiers of memory cells, in other examples, the memory array 200 can include more or fewer blocks, sub-blocks, physical pages, strings of memory cells, memory cells, or tiers. For example, each string of memory cells can include more or fewer tiers (e.g., 16, 32, 64, 128, etc.), as well as one or more additional tiers of semiconductor material above or below the charge storage transistors (e.g., select gates, data lines, etc.), as desired. As an example, a 48 GB TLC NAND memory device can include 18,592 bytes (B) of data per page (16,384+2208 bytes), 1536 pages per block, 548 blocks per plane, and 4 or more planes per device.

Each memory cell in the memory array 200 includes a control gate (CG) coupled to (e.g., electrically or otherwise operatively connected to) an access line (e.g., word lines (WL) $WL0_0$-$WL7_0$ 210A-217A, $WL0_1$-$WL7_1$ 210B-217B, etc.), which collectively couples the control gates (CGs) across a specific tier, or a portion of a tier, as desired. Specific tiers in the 3D memory array, and accordingly, specific memory cells in a string, can be accessed or controlled using respective access lines. Groups of select gates can be accessed using various select lines. For example, first-third $A_0$ SGD $226A_0$-$228A_0$ can be accessed using an $A_0$ SGD line $SGDA_0$ $225A_0$, first-third $A_n$ SGD $226A_n$-$228A_n$ can be accessed using an $A_n$ SGD line $SGDA_n$ $225A_n$, first-third $B_0$ SGD $226B_0$-$228B_0$ can be accessed using an $B_0$ SGD line $SGDB_0$ $225B_0$, and first-third $B_n$ SGD $226B_n$-$228B_n$ can be accessed using an $B_n$ SGD line $SGDB_n$ $225B_n$. First-third $A_0$ SGS $231A_0$-$233A_0$ and first-third $A_n$ SGS $231A_n$-$233A_n$ can be accessed using a gate select line $SGS_0$ 230A, and first-third $B_0$ SGS $231B_0$-$233B_0$ and first-third $B_n$ SGS $231B_n$-$233B_n$ can be accessed using a gate select line $SGS_1$ 230B.

In an example, the memory array 200 can include a number of levels of semiconductor material (e.g., polysilicon, etc.) configured to couple the control gates (CGs) of each memory cell or select gate (or a portion of the CGs or select gates) of a respective tier of the array. Specific strings of memory cells in the array can be accessed, selected, or controlled using a combination of bit lines (BLs) and select gates, etc., and specific memory cells at one or more tiers in the specific strings can be accessed, selected, or controlled using one or more access lines (e.g., word lines).

Figure 3:
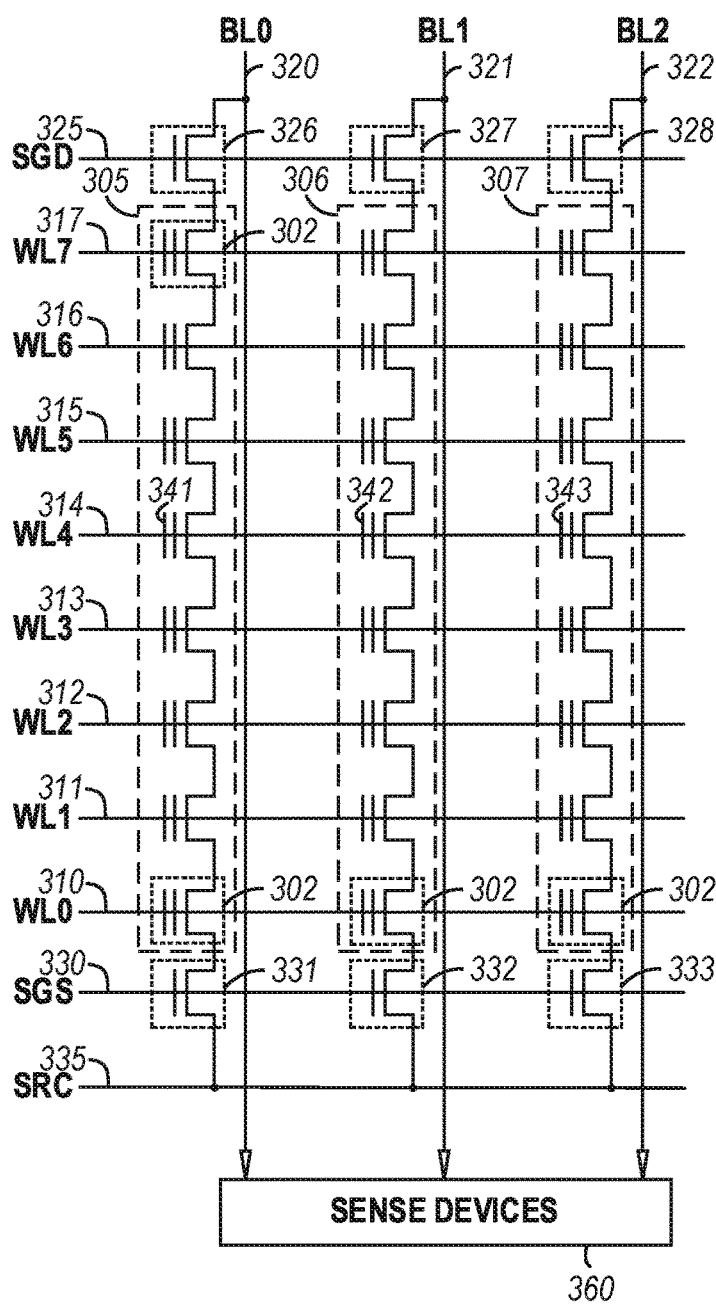

FIG. 3 illustrates an example schematic diagram of a portion of a NAND architecture semiconductor memory array 300 including a plurality of memory cells 302 arranged in a two-dimensional array of strings (e.g., first-third strings 305-307) and tiers (e.g., illustrated as respective word lines (WL) WL0-WL7 310-317, a drain-side select gate (SGD) line 325, a source-side select gate (SGS) line 330, etc.), and sense amplifiers or devices 360. For example, the memory array 300 can illustrate an example schematic diagram of a portion of one physical page of memory cells of a 3D NAND architecture semiconductor memory device, such as illustrated in FIG. 2.

Each string of memory cells is coupled to a source line (SRC) using a respective source-side select gate (SGS) (e.g., first-third SGS 331-333), and to a respective data line (e.g., first-third bit lines (BL) BL0-BL2 320-322) using a respective drain-side select gate (SGD) (e.g., first-third SGD 326-328). Although illustrated with 8 tiers (e.g., using word lines (WL) WL0-WL7 310-317) and three data lines (BL0-BL2 326-328) in the example of FIG. 3, other examples can include strings of memory cells having more or fewer tiers or data lines, as desired.

In a NAND architecture semiconductor memory array, such as the example memory array 300, the state of a selected memory cell 302 can be accessed by sensing a current or voltage variation associated with a particular data line containing the selected memory cell. The memory array 300 can be accessed (e.g., by a control circuit, one or more processors, digital logic, etc.) using one or more drivers. In an example, one or more drivers can activate a specific memory cell, or set of memory cells, by driving a particular potential to one or more data lines (e.g., bit lines BL0-BL2), access lines (e.g., word lines WL0-WL7), or select gates, depending on the type of operation desired to be performed on the specific memory cell or set of memory cells.

To program or write data to a memory cell, a programming voltage (Vpgm) (e.g., one or more programming pulses, etc.) can be applied to selected word lines (e.g., WL4), and thus, to a control gate of each memory cell coupled to the selected word lines (e.g., first-third control gates (CGs) 341-343 of the memory cells coupled to WL4). Programming pulses can begin, for example, at or near 15V, and, in certain examples, can increase in magnitude during each programming pulse application. While the program voltage is applied to the selected word lines, a potential, such as a ground potential (e.g., Vss), can be applied to the data lines (e.g., bit lines) and substrates (and thus the channels, between the sources and drains) of the memory cells targeted for programming, resulting in a charge transfer (e.g., direct injection or Fowler-Nordheim (FN) tunneling, etc.) from the channels to the floating gates of the targeted memory cells.

In contrast, a pass voltage (Vpass) can be applied to one or more word lines having memory cells that are not targeted for programming, or an inhibit voltage (e.g., Vcc) can be applied to data lines (e.g., bit lines) having memory cells that are not targeted for programming, for example, to inhibit charge from being transferred from the channels to the floating gates of such non-targeted memory cells. The pass voltage can be variable, depending, for example, on the proximity of the applied pass voltages to a word line targeted for programming. The inhibit voltage can include a supply voltage (Vcc), such as a voltage from an external source or supply (e.g., a battery, an AC-to-DC converter, etc.), relative to a ground potential (e.g., Vss).

As an example, if a programming voltage (e.g., 15V or more) is applied to a specific word line, such as WL4, a pass voltage of 10V can be applied to one or more other word lines, such as WL3, WL5, etc., to inhibit programming of non-targeted memory cells, or to retain the values stored on such memory cells not targeted for programming. As the distance between an applied program voltage and the non-targeted memory cells increases, the pass voltage required to refrain from programming the non-targeted memory cells can decrease. For example, where a programming voltage of 15V is applied to WL4, a pass voltage of 10V can be applied to WL3 and WL5, a pass voltage of 8V can be applied to WL2 and WL6, a pass voltage of 7V can be applied to WL1 and WL7, etc. In other examples, the pass voltages, or number of word lines, etc., can be higher or lower, or more or less.

The sense amplifiers 360, coupled to one or more of the data lines (e.g., first, second, or third bit lines (BL0-BL2) 320-322), can detect the state of each memory cell in respective data lines by sensing a voltage or current on a particular data line.

Between applications of one or more programming pulses (e.g., Vpgm), a verify operation can be performed to determine if a selected memory cell has reached its intended programmed state. If the selected memory cell has reached its intended programmed state, it can be inhibited from further programming. If the selected memory cell has not reached its intended programmed state, additional programming pulses can be applied. If the selected memory cell has not reached its intended programmed state after a particular number of programming pulses (e.g., a maximum number), the selected memory cell, or a string, block, or page associated with such selected memory cell, can be marked as defective.

To erase a memory cell or a group of memory cells (e.g., erasure is typically performed in blocks or sub-blocks), an erasure voltage (Vers) (e.g., typically Vpgm) can be applied to the substrates (and thus the channels, between the sources and drains) of the memory cells targeted for erasure (e.g., using one or more bit lines, select gates, etc.), while the word lines of the targeted memory cells are kept at a potential, such as a ground potential (e.g., Vss), resulting in a charge transfer (e.g., direct injection or Fowler-Nordheim (FN) tunneling, etc.) from the floating gates of the targeted memory cells to the channels.

Figure 4:
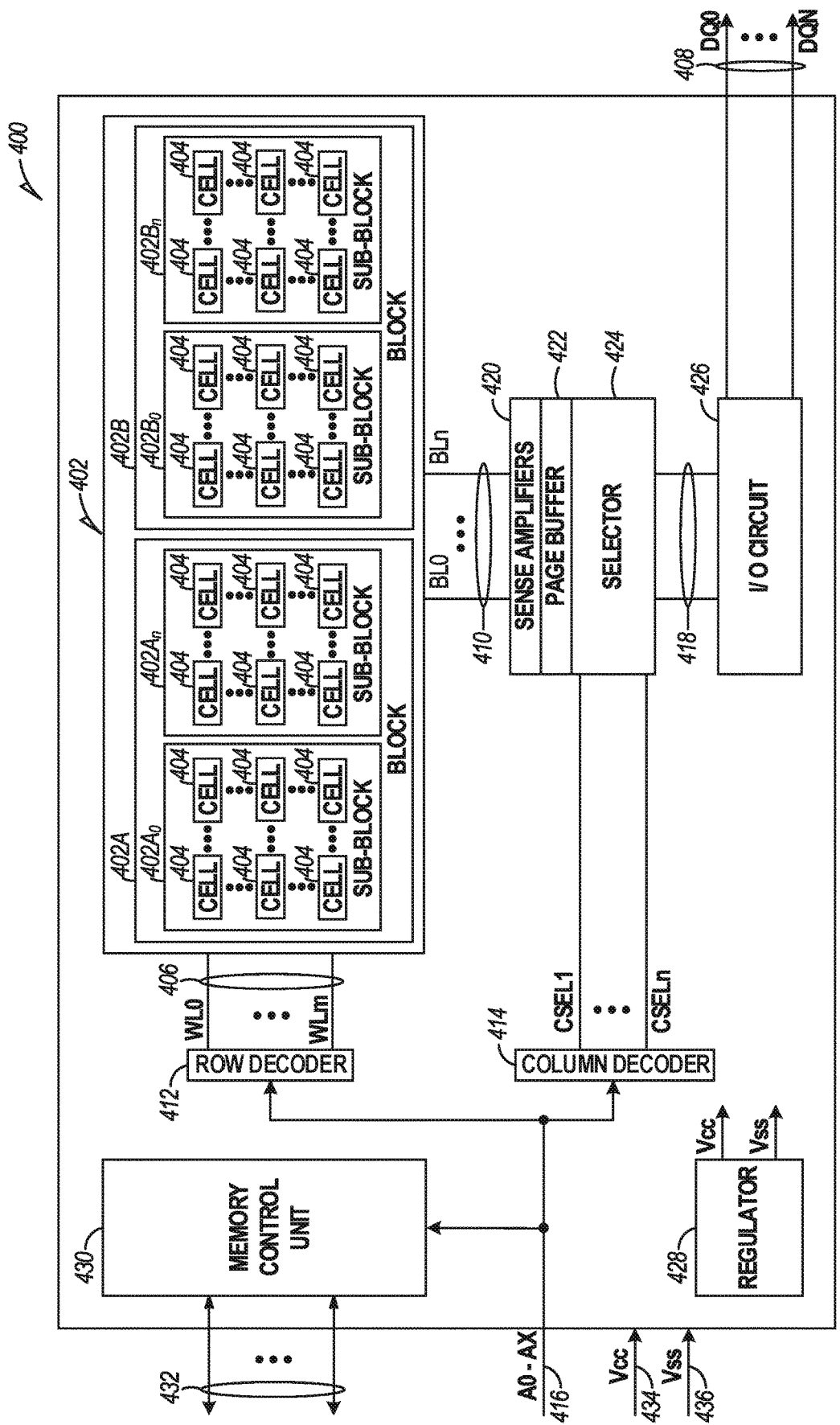
FIG. 4 illustrates an example block diagram of a memory module.

FIG. 4 illustrates an example block diagram of a memory device 400 including a memory array 402 having a plurality of memory cells 404, and one or more circuits or components to provide communication with, or perform one or more memory operations on, the memory array 402. The memory device 400 can include a row decoder 412, a column decoder 414, sense amplifiers 420, a page buffer 422, a selector 424, an input/output (I/O) circuit 426, and a memory control unit 430.

The memory cells 404 of the memory array 402 can be arranged in blocks, such as first and second blocks 402A, 402B. Each block can include sub-blocks. For example, the first block 402A can include first and second sub-blocks 402A$_0$, 402A$_n$, and the second block 402B can include first and second sub-blocks 402B$_0$, 402B$_n$. Each sub-block can include a number of physical pages, each page including a number of memory cells 404. Although illustrated herein as having two blocks, each block having two sub-blocks, and each sub-block having a number of memory cells 404, in other examples, the memory array 402 can include more or fewer blocks, sub-blocks, memory cells, etc. In other examples, the memory cells 404 can be arranged in a number of rows, columns, pages, sub-blocks, blocks, etc., and accessed using, for example, access lines 406, first data lines 410, or one or more select gates, source lines, etc.

The memory control unit 430 can control memory operations of the memory device 400 according to one or more signals or instructions received on control lines 432, including, for example, one or more clock signals or control signals that indicate a desired operation (e.g., write, read, erase, etc.), or address signals (A0-AX) received on one or more address lines 416. One or more devices external to the memory device 400 can control the values of the control signals on the control lines 432, or the address signals on the address line 416. Examples of devices external to the memory device 400 can include, but are not limited to, a host, a memory controller, a processor, or one or more circuits or components not illustrated in FIG. 4.

The memory device 400 can use access lines 406 and first data lines 410 to transfer data to (e.g., write or erase) or from (e.g., read) one or more of the memory cells 404. The row decoder 412 and the column decoder 414 can receive and decode the address signals (A0-AX) from the address line 416, can determine which of the memory cells 404 are to be accessed, and can provide signals to one or more of the access lines 406 (e.g., one or more of a plurality of word lines (WL0-WLm)) or the first data lines 410 (e.g., one or more of a plurality of bit lines (BL0-BLn)), such as described above.

The memory device 400 can include sense circuitry, such as the sense amplifiers 420, configured to determine the values of data on (e.g., read), or to determine the values of data to be written to, the memory cells 404 using the first data lines 410. For example, in a selected string of memory cells 404, one or more of the sense amplifiers 420 can read a logic level in the selected memory cell 404 in response to a read current flowing in the memory array 402 through the selected string to the data lines 410.

One or more devices external to the memory device 400 can communicate with the memory device 400 using the I/O lines (DQ0-DQN) 408, address lines 416 (A0-AX), or control lines 432. The input/output (I/O) circuit 426 can transfer values of data in or out of the memory device 400, such as in or out of the page buffer 422 or the memory array 402, using the I/O lines 408, according to, for example, the control lines 432 and address lines 416. The page buffer 422 can store data received from the one or more devices external to the memory device 400 before the data is programmed into relevant portions of the memory array 402, or can store data read from the memory array 402 before the data is transmitted to the one or more devices external to the memory device 400.

The column decoder 414 can receive and decode address signals (A0-AX) into one or more column select signals (CSEL1-CSELn). The selector 424 (e.g., a select circuit) can receive the column select signals (CSEL1-CSELn) and select data in the page buffer 422 representing values of data to be read from or to be programmed into memory cells 404. Selected data can be transferred between the page buffer 422 and the I/O circuit 426 using second data lines 418.

The memory control unit 430 can receive positive and negative supply signals, such as a supply voltage (Vcc) 434 and a negative supply (Vss) 436 (e.g., a ground potential), from an external source or supply (e.g., an internal or external battery, an AC-to-DC converter, etc.). In certain examples, the memory control unit 430 can include a regulator 428 to internally provide positive or negative supply signals.

Figure 5:
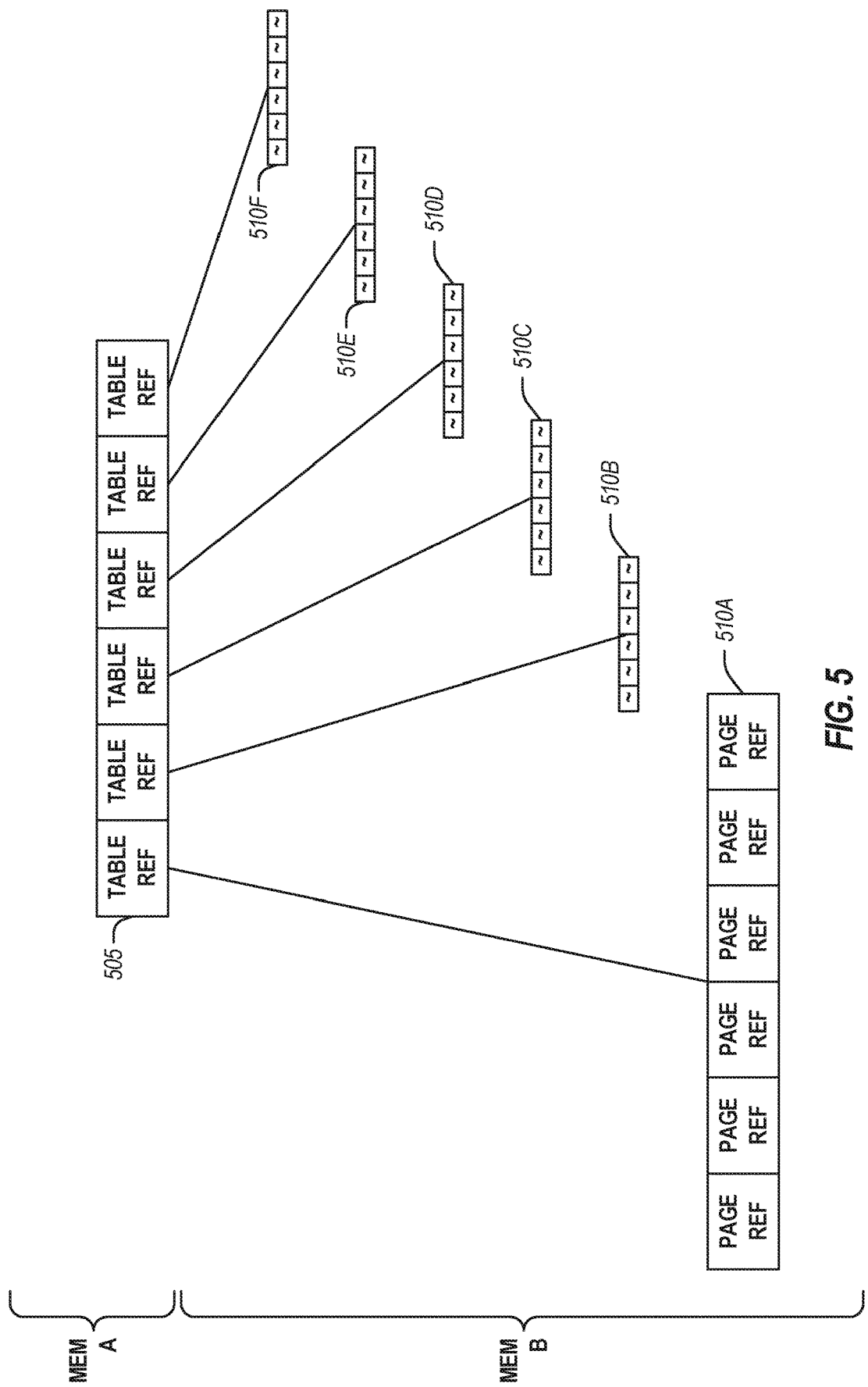
FIG. 5 illustrates a translation table data structure, including a top-level table portion wholly contained within a first memory.

FIG. 5 illustrates a translation table data structure, including a top-level table portion 505 wholly contained within a first memory (MEM A). The top-level table portion 505 includes entries that reference lower table levels 510 (e.g., portions 510A-510F as illustrated). Generally, MEM A is a fast byte-addressable memory, such as SRAM or DRAM, and MEM B is a slower non-byte-addressable memory such as flash memory. Thus, the top-level table portion 505 is cached in MEM A for performance reasons while the rest of the translation table is efficiently stored in MEM B. While effective, this organization limits the size of the top-level table portion 505 to the available space on MEM A.

Figure 6:
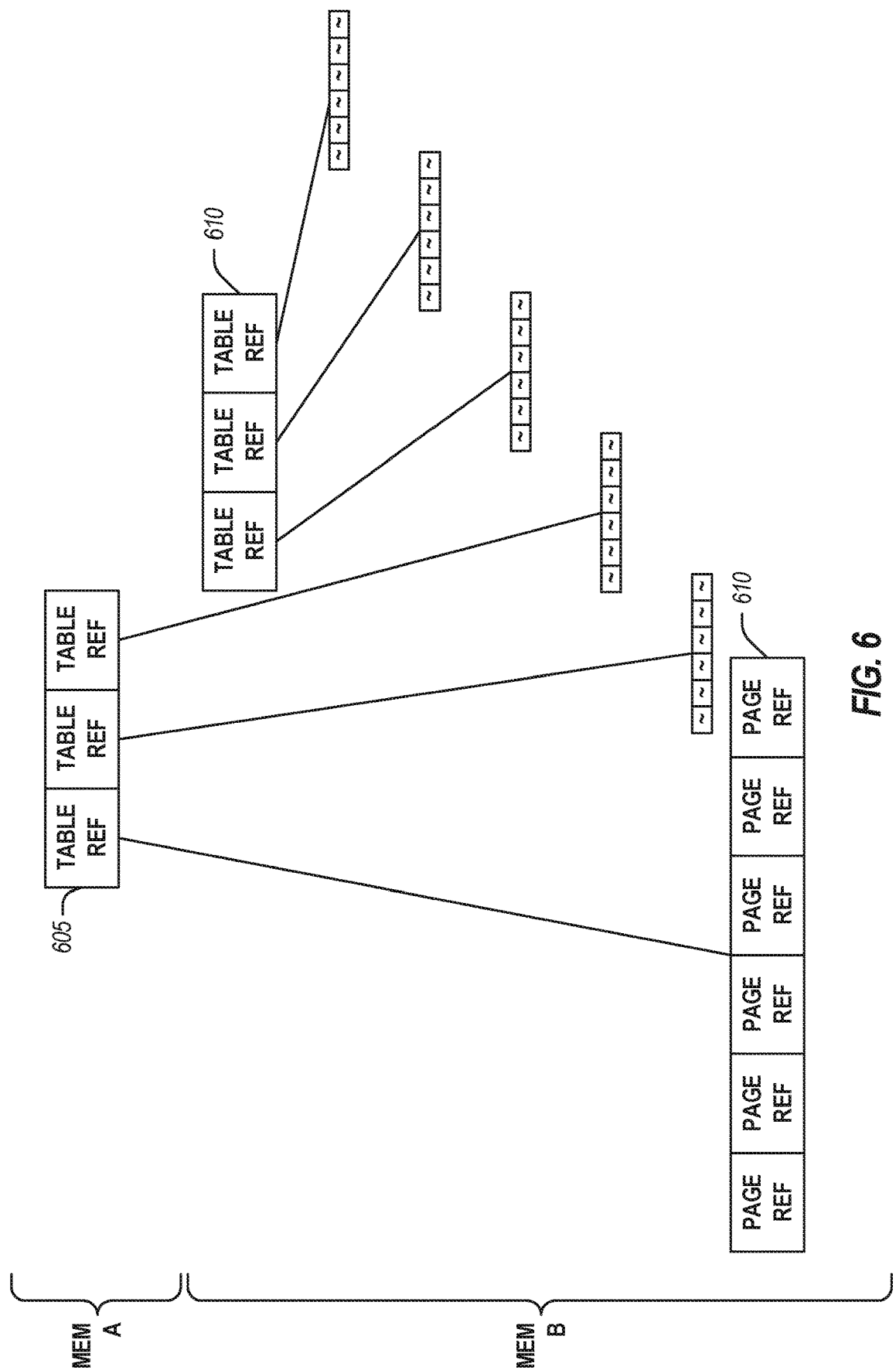
FIG. 6 illustrates a translation table data structure, including a top-level table portion divided between a first memory and a second memory.

FIG. 6 illustrates a translation table data structure, including a top-level table portion divided between a first memory and a second memory. In contrast to the organization illustrated in FIG. 5, here the top-level table portion is split between a first portion 605 resident in MEM A and a second portion 610 resident in MEM B. Again, every entry from either portions 605 or 610 refer to a lower-level 610 of the translation table. Thus, there is no increase in tree depth for the translation table with this organization.

The illustrated translation table organization decouples the size of the top-level table portion from the size of MEM A. This allows a smaller MEM A, which may reduce manufacturing costs, without impacting the operation of the translation table. Although FIG. 6 only illustrates a top-level table portion split between MEM A and MEM B, the same organization may be applied to lower levels of the translation table as well. In all such cases, however, the table depth is not increased.

Figure 7:
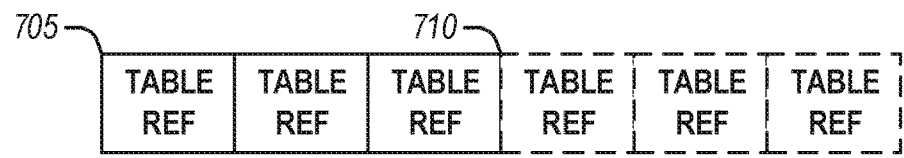
FIGS. 7-8 illustrate storage organizations for a single level translation table portion that is divided between multiple memories.
Figure 8:
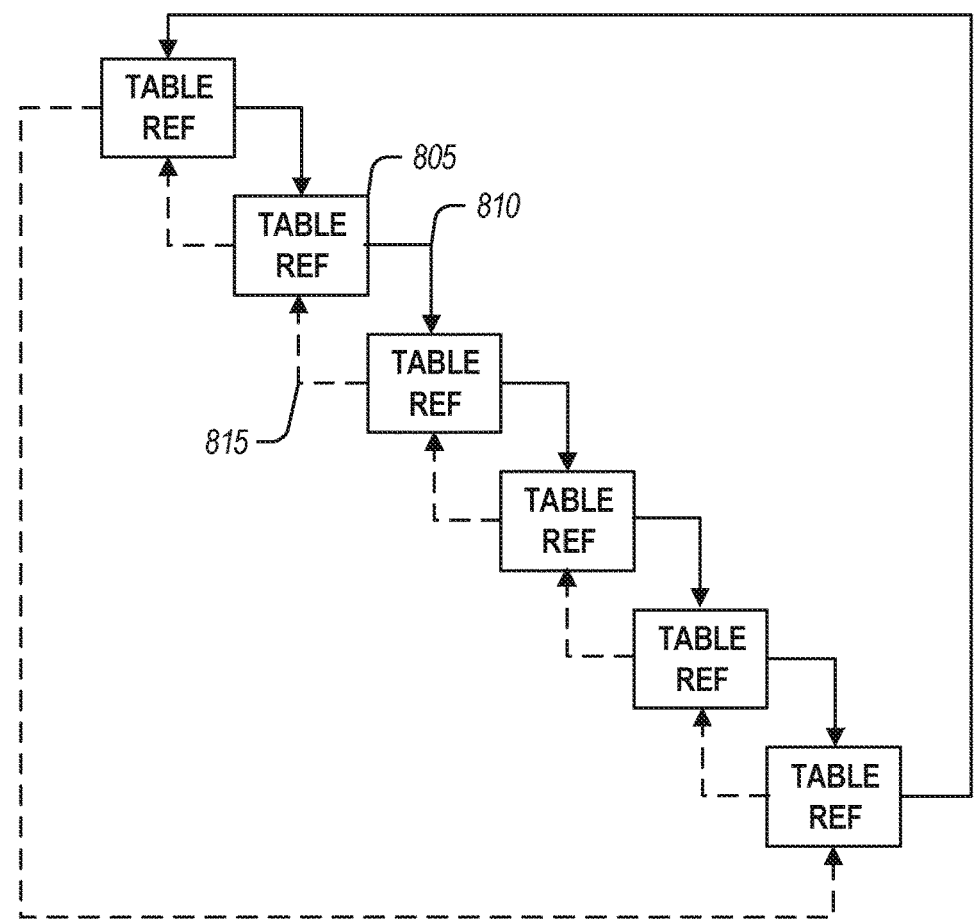

FIGS. 7-8 illustrate storage organizations for a single level translation table portion that is divided between multiple memories. To split a table portion into two or more segments, the table portion is organized to allow reconstruction of the segments in the case where a cached (e.g., MEM A) segment does not have the data to perform the translation. FIG. 7 illustrates one such organization. Here, the entries of the table portion are written to contiguous portions of the storage device (e.g., MEM B), such as in contiguous pages, blocks, etc. Accordingly, segment 705 may be stored in page 1 while segment 710 is stored in page 2. To replace segment 705 in cache, the controller simply advances the address of segment 705 in storage by an offset (e.g., one page) to find and load segment 710.

FIG. 8 illustrates a more complicated, yet more powerful, organization than that illustrated in FIG. 7. Here, entries include pointers to other entries. For example, Entry 805 includes a forward pointer 810 to the next entry, forming a linked list. A doubly linked list may be formed if the entry 805 also includes a back-pointer 815 to a previous entry. In an example, a block of entries (e.g., such as segment 705 from FIG. 7) include the pointers. This organization may save on overhead if, for example, multiple entries are stored on a smallest addressable element of the storage device (e.g., multiple entries are stored in a flash page).

Figure 9:
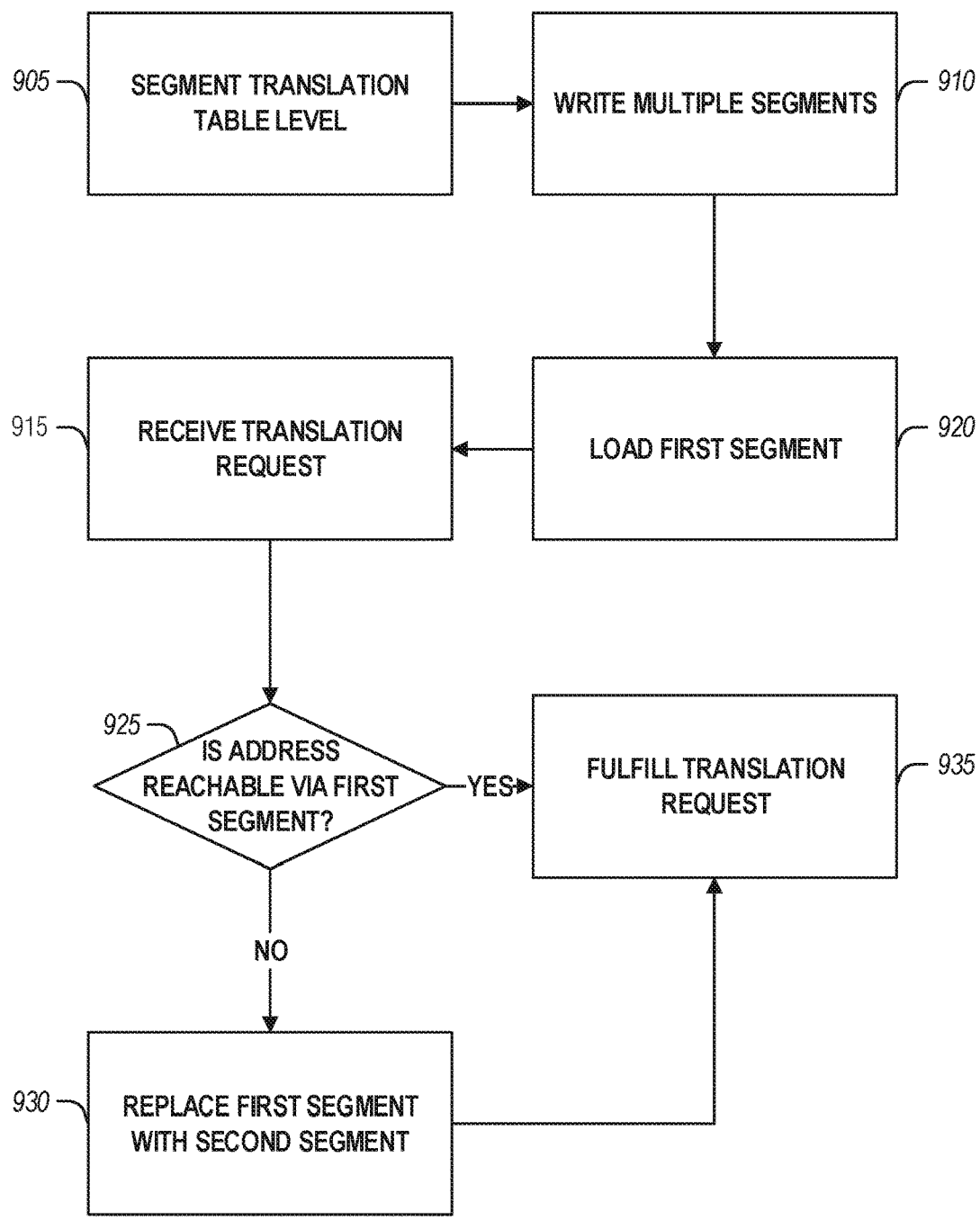
FIG. 9 illustrates a flowchart of a method for memory constrained translation table management.

FIG. 9 illustrates a flowchart of a method 900 for memory constrained translation table management. The operations of the method 900 are performed by hardware, such as that described above with respect to FIGS. 1-4, or below with respect to FIG. 10 (e.g., processing circuitry).

At operation 905, a level of a translation table is logically segmented into multiple segments. In an example, the level is a top level of the translation table. In an example, a bottom level of the translation table includes a logical to physical address pairing for a portion of a storage device. In an example, the storage device is a three-dimensional NAND Flash device. In an example, the operations of the method 900 are performed by a controller packaged in the storage device.

At operation 910, the multiple segments are written to the storage device. In an example, writing the multiple segments to the storage device includes implementing a constraint on locations of the storage device to which the multiple segments may be written. In an example, the constraint requires the locations of the storage device to be contiguous. In an example, more than one of the multiple segments are written to a smallest addressable portion of the storage device.

In an example, the constraint corresponds to a physical attribute of the storage device. In an example, storage device is a NAND array and the physical attribute is a fixed page, block, or die that repeats within the storage device. In an example, the fixed page is a first page in a set of blocks, the block is a first block in a set of die, and the die is a first die in the NAND array.

At operation 915, a first segment of the multiple segments is loaded to byte-addressable memory. In an example, loading the first segment of the multiple segments to the byte-addressable memory includes adding a pointer to the second segment to the byte-addressable memory. In an example, loading the first segment of the multiple segments to the byte-addressable memory includes adding a second pointer to a third second segment of the multiple segments to the byte-addressable memory. In an example, the multiple segments are ordered and the third segment precedes the first segment while the second segment follows the first segment. In an example, the pointer is the only pointer to another segment of the multiple segments. In an example, all of the multiple segments are addressable by a respective pointer to form a ring data structure.

At operation 920, a request for an address translation is received.

At decision 925, a determination is made as to whether the request is for an address referred to by the first segment or a second segment of the multiple segments. If the request is for the first segment, the method 900 proceeds to operation 930. Otherwise, the method 900 proceeds to operation 935.

At operation 930, the first segment is replaced with the second segment in the byte-addressable memory. In an example, replacing the first segment with the second segment includes searching the fixed page, block, or die for the second segment. In an example, searching for the second segment includes comparing each repetition of the fixed page, block, or die until a translation table marker is found.

At operation 935, the request is fulfilled using the segment loaded into the byte-addressable memory to locate a lower level of the translation table that includes the address translation.

Figure 10:
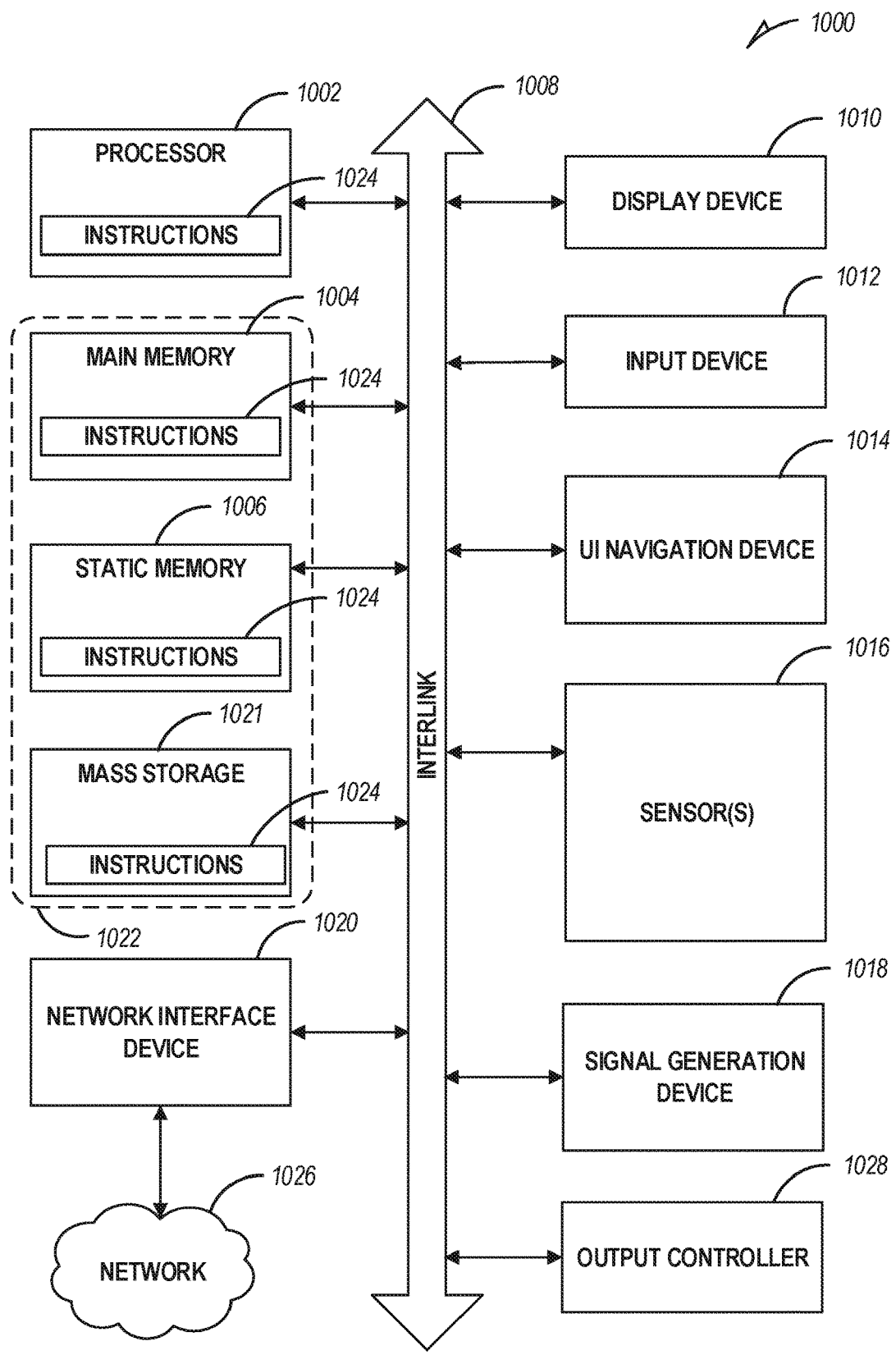
FIG. 10 is a block diagram illustrating an example of a machine upon which one or more embodiments may be implemented.

FIG. 10 illustrates a block diagram of an example machine 1000 upon which any one or more of the techniques (e.g., methodologies) discussed herein may perform. In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 1000 (e.g., the host device 105, the memory device 110, etc.) may include a hardware processor 1002 (e.g., a central processing unit (CPU), a graphics processing unit (GPU), a hardware processor core, or any combination thereof, such as the memory controller 115, etc.), a main memory 1004 and a static memory 1006, some or all of which may communicate with each other via an interlink (e.g., bus) 1008. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1016, a signal generation device 1018 (e.g., a speaker), a network interface device 1020, and one or more sensors 1016, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1016 may include a machine readable medium 1022 on which is stored one or more sets of data structures or instructions 1024 (e.g., software) embodying or utilized by any one or more of the techniques or functions described herein. The instructions 1024 may also reside, completely or at least partially, within the main memory 1004, within static memory 1006, or within the hardware processor 1002 during execution thereof by the machine 1000. In an example, one or any combination of the hardware processor 1002, the main memory 1004, the static memory 1006, or the storage device 1016 may constitute the machine readable medium 1022.

While the machine readable medium 1022 is illustrated as a single medium, the term "machine readable medium" may include a single medium or multiple media (e.g., a centralized or distributed database, or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 (e.g., software, programs, an operating system (OS), etc.) or other data are stored on the storage device 1021, can be accessed by the memory 1004 for use by the processor 1002. The memory 1004 (e.g., DRAM) is typically fast, but volatile, and thus a different type of storage than the storage device 1021 (e.g., an SSD), which is suitable for long-term storage, including while in an "off" condition. The instructions 1024 or data in use by a user or the machine 1000 are typically loaded in the memory 1004 for use by the processor 1002. When the memory 1004 is full, virtual space from the storage device 1021 can be allocated to supplement the memory 1004; however, because the storage 1021 device is typically slower than the memory 1004, and write speeds are typically at least twice as slow as read speeds, use of virtual memory can greatly reduce user experience due to storage device latency (in contrast to the memory 1004, e.g., DRAM). Further, use of the storage device 1021 for virtual memory can greatly reduce the usable lifespan of the storage device 1021.

In contrast to virtual memory, virtual memory compression (e.g., the Linux® kernel feature "ZRAM") uses part of the memory as compressed block storage to avoid paging to the storage device 1021. Paging takes place in the compressed block until it is necessary to write such data to the storage device 1021. Virtual memory compression increases the usable size of memory 1004, while reducing wear on the storage device 1021.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device, and are often removable and separate components from the host device. In contrast, eMMC™ devices are attached to a circuit board and considered a component of the host device, with read speeds that rival serial ATA™ (Serial AT (Advanced Technology) Attachment, or SATA)

based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 1024 may further be transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software.

Additional Examples

Example 1 is a device for memory translation table management, the device comprising: a byte-addressable memory; a storage device; and a controller to: logically segment a level of a translation table into multiple segments, wherein a bottom level of the translation table includes, a logical to physical address pairing for a portion of the storage device, and other levels of the translation table include references within the translation table; write the multiple segments to the storage device; load a first segment of the multiple segments to the byte-addressable memory; receive a request for an address translation; determine that the request is for an address referred to by a second segment of the multiple segments; replace the first segment with the second segment in the byte-addressable memory; and fulfill the request using the second segment to locate a lower level of the translation table that includes the address translation.

In Example 2, the subject matter of Example 1 includes, wherein, to write the multiple segments to the storage device, the controller implements a constraint on locations of the storage device to which the multiple segments may be written.

In Example 3, the subject matter of Example 2 includes, wherein the constraint requires the locations of the storage device to be contiguous.

In Example 4, the subject matter of Example 3 includes, wherein more than one of the multiple segments are written to a smallest addressable portion of the storage device.

In Example 5, the subject matter of Examples 2-4 includes, wherein the constraint corresponds to a physical attribute of the storage device.

In Example 6, the subject matter of Example 5 includes, wherein the physical attribute is a fixed page, sub-block, block, or die that repeats within the storage device, wherein the storage device is a NAND array.

In Example 7, the subject matter of Example 6 includes, wherein the fixed page is a first page in a block, the fixed block is a first block in a die, and the fixed die is a first die in the NAND array.

In Example 8, the subject matter of Examples 6-7 includes, wherein, to replace the first segment with the second segment, the controller searches the fixed page, block, or die for the second segment.

In Example 9, the subject matter of Example 8 includes, wherein, to search for the second segment, the controller inspects each repetition of the fixed page, block, or die until a translation table marker is found.

In Example 10, the subject matter of Examples 1-9 includes, wherein, to load the first segment of the multiple segments to the byte-addressable memory, the controller adds a pointer to the second segment to the byte-addressable memory.

In Example 11, the subject matter of Example 10 includes, wherein, to load the first segment of the multiple segments to the byte-addressable memory, the controller adds a second pointer to a third second segment of the multiple segments to the byte-addressable memory, wherein the multiple segments are ordered, and wherein the third segment precedes the first segment and the second segment follows the first segment.

In Example 12, the subject matter of Examples 10-11 includes, wherein the pointer is the only pointer to another segment of the multiple segments, and wherein all of the multiple segments are addressable by a respective pointer to form a ring data structure.

In Example 13, the subject matter of Examples 1-12 includes, wherein the device is a three-dimensional NAND Flash device.

Example 14 is a method for memory translation table management, the method comprising: logically segmenting a level of a translation table into multiple segments, wherein a bottom level of the translation table includes, a logical to physical address pairing for a portion of a storage device, and other levels of the translation table include references within the translation table; writing the multiple segments to the storage device; loading a first segment of the multiple segments to byte-addressable memory; receiving a request for an address translation; determining that the request is for an address referred to by a second segment of the multiple segments; replacing the first segment with the second segment in the byte-addressable memory; and fulfilling the request using the second segment to locate a lower level of the translation table that includes the address translation.

In Example 15, the subject matter of Example 14 includes, wherein writing the multiple segments to the storage device includes implementing a constraint on locations of the storage device to which the multiple segments may be written.

In Example 16, the subject matter of Example 15 includes, wherein the constraint requires the locations of the storage device to be contiguous.

In Example 17, the subject matter of Example 16 includes, wherein more than one of the multiple segments are written to a smallest addressable portion of the storage device.

In Example 18, the subject matter of Examples 15-17 includes, wherein the constraint corresponds to a physical attribute of the storage device.

In Example 19, the subject matter of Example 18 includes, wherein the physical attribute is a fixed page, sub-block, block, or die that repeats within the storage device, wherein the storage device is a NAND array.

In Example 20, the subject matter of Example 19 includes, wherein the fixed page is a first page in a block, the fixed block is a first block in a die, and the fixed die is a first die in the NAND array.

In Example 21, the subject matter of Examples 19-20 includes, wherein replacing the first segment with the second segment includes searching the fixed page, block, or die for the second segment.

In Example 22, the subject matter of Example 21 includes, wherein searching for the second segment includes inspecting each repetition of the fixed page, block, or die until a translation table marker is found.

In Example 23, the subject matter of Examples 14-22 includes, wherein loading the first segment of the multiple segments to the byte-addressable memory includes adding a pointer to the second segment to the byte-addressable memory.

In Example 24, the subject matter of Example 23 includes, wherein loading the first segment of the multiple segments to the byte-addressable memory includes adding a second pointer to a third second segment of the multiple segments to the byte-addressable memory, wherein the multiple segments are ordered, and wherein the third segment precedes the first segment and the second segment follows the first segment.

In Example 25, the subject matter of Examples 23-24 includes, wherein the pointer is the only pointer to another segment of the multiple segments, and wherein all of the multiple segments are addressable by a respective pointer to form a ring data structure.

In Example 26, the subject matter of Examples 14-25 includes, wherein the storage device is a three-dimensional NAND Flash device, and wherein the operations are performed by a controller packaged in the storage device.

Example 27 is at least one machine readable medium including instructions that, when executed by processing circuitry, cause the processing circuitry to perform any method of Examples 14-26.

Example 28 is a system comprising means to perform any method of Examples 14-26.

Example 29 is at least one machine readable medium including instructions that, when executed by processing circuitry, cause the processing circuitry to perform operations comprising: logically segmenting a level of a translation table into multiple segments, wherein a bottom level of the translation table includes, a logical to physical address pairing for a portion of a storage device, and other levels of the translation table include references within the translation table; writing the multiple segments to the storage device; loading a first segment of the multiple segments to byte-addressable memory; receiving a request for an address translation; determining that the request is for an address referred to by a second segment of the multiple segments; replacing the first segment with the second segment in the byte-addressable memory; and fulfilling the request using the second segment to locate a lower level of the translation table that includes the address translation.

In Example 30, the subject matter of Example 29 includes, wherein writing the multiple segments to the storage device includes implementing a constraint on locations of the storage device to which the multiple segments may be written.

In Example 31, the subject matter of Example 30 includes, wherein the constraint requires the locations of the storage device to be contiguous.

In Example 32, the subject matter of Example 31 includes, wherein more than one of the multiple segments are written to a smallest addressable portion of the storage device.

In Example 33, the subject matter of Examples 30-32 includes, wherein the constraint corresponds to a physical attribute of the storage device.

In Example 34, the subject matter of Example 33 includes, wherein the physical attribute is a fixed page, sub-block, block, or die that repeats within the storage device, wherein the storage device is a NAND array.

In Example 35, the subject matter of Example 34 includes, wherein the fixed page is a first page in a block, the fixed block is a first block in a die, and the fixed die is a first die in the NAND array.

In Example 36, the subject matter of Examples 34-35 includes, wherein replacing the first segment with the second segment includes searching the fixed page, block, or die for the second segment.

In Example 37, the subject matter of Example 36 includes, wherein searching for the second segment includes inspecting each repetition of the fixed page, block, or die until a translation table marker is found.

In Example 38, the subject matter of Examples 29-37 includes, wherein loading the first segment of the multiple segments to the byte-addressable memory includes adding a pointer to the second segment to the byte-addressable memory.

In Example 39, the subject matter of Example 38 includes, wherein loading the first segment of the multiple segments to the byte-addressable memory includes adding a second pointer to a third second segment of the multiple segments to the byte-addressable memory, wherein the multiple segments are ordered, and wherein the third segment precedes the first segment and the second segment follows the first segment.

In Example 40, the subject matter of Examples 38-39 includes, wherein the pointer is the only pointer to another segment of the multiple segments, and wherein all of the multiple segments are addressable by a respective pointer to form a ring data structure.

In Example 41, the subject matter of Examples 29-40 includes, wherein the storage device is a three-dimensional NAND Flash device, and wherein the operations are performed by a controller packaged in the storage device.

Example 42 is a system for memory translation table management, the system comprising: means for logically segmenting a level of a translation table into multiple segments, wherein a bottom level of the translation table includes, a logical to physical address pairing for a portion of a storage device, and other levels of the translation table include references within the translation table; means for writing the multiple segments to the storage device; means for loading a first segment of the multiple segments to byte-addressable memory; means for receiving a request for an address translation; means for determining that the request is for an address referred to by a second segment of the multiple segments; means for replacing the first segment with the second segment in the byte-addressable memory; and means for fulfilling the request using the second segment to locate a lower level of the translation table that includes the address translation.

In Example 43, the subject matter of Example 42 includes, wherein the means for writing the multiple segments to the storage device include means for implementing a constraint on locations of the storage device to which the multiple segments may be written.

In Example 44, the subject matter of Example 43 includes, wherein the constraint requires the locations of the storage device to be contiguous.

In Example 45, the subject matter of Example 44 includes, wherein more than one of the multiple segments are written to a smallest addressable portion of the storage device.

In Example 46, the subject matter of Examples 43-45 includes, wherein the constraint corresponds to a physical attribute of the storage device.

In Example 47, the subject matter of Example 46 includes, wherein the physical attribute is a fixed page, sub-block, block, or die that repeats within the storage device, wherein the storage device is a NAND array.

In Example 48, the subject matter of Example 47 includes, wherein the fixed page is a first page in a block, the fixed block is a first block in a die, and the fixed die is a first die in the NAND array.

In Example 49, the subject matter of Examples 47-48 includes, wherein the means for replacing the first segment with the second segment include means for searching the fixed page, block, or die for the second segment.

In Example 50, the subject matter of Example 49 includes, wherein the means for searching for the second segment include means for inspecting each repetition of the fixed page, block, or die until a translation table marker is found.

In Example 51, the subject matter of Examples 42-50 includes, wherein the means for loading the first segment of the multiple segments to the byte-addressable memory include means for adding a pointer to the second segment to the byte-addressable memory.

In Example 52, the subject matter of Example 51 includes, wherein the means for loading the first segment of the multiple segments to the byte-addressable memory include means for adding a second pointer to a third second segment of the multiple segments to the byte-addressable memory, wherein the multiple segments are ordered, and wherein the third segment precedes the first segment and the second segment follows the first segment.

In Example 53, the subject matter of Examples 51-52 includes, wherein the pointer is the only pointer to another segment of the multiple segments, and wherein all of the multiple segments are addressable by a respective pointer to form a ring data structure.

In Example 54, the subject matter of Examples 42-53 includes, wherein the storage device is a three-dimensional NAND Flash device, and wherein the operations are performed by a controller packaged in the storage device.

Example 55 is at least one machine-readable medium including instructions that, when executed by processing circuitry, cause the processing circuitry to perform operations to implement of any of Examples 1-54.

Example 56 is an apparatus comprising means to implement of any of Examples 1-54.

Example 57 is a system to implement of any of Examples 1-54.

Example 58 is a method to implement of any of Examples 1-54.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate, but may instead be generally perpendicular to the surface of the substrate, and may form an acute angle with the surface of the substrate (e.g., between 60 and 120 degrees, etc.).

In some embodiments described herein, different doping configurations may be applied to a source-side select gate (SGS), a control gate (CG), and a drain-side select gate (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the CG may form recesses, while the SGD may remain less recessed or even not recessed. These doping configurations may thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A device for memory translation table management, the device comprising:
    a byte-addressable memory;
    a storage device; and
    a controller configured to:
        load, from the storage device to the byte-addressable memory, a first segment of multiple segments of a logical-to-physical (L2P) translation table, wherein a bottom level of the L2P translation table includes a logical to physical address pairing for a portion of the storage device, and other levels of the L2P translation table include references within the L2P translation table;
        receive a request for an address translation;

determine whether the request is for an address referred to by a second segment of the multiple segments; and
in accordance with a determination that the request is for an address referred to by the second segment:
replace the first segment with the second segment in the byte-addressable memory; and
fulfill the request using the second segment to locate a lower level of the L2P translation table that includes the address translation.

2. The device of claim 1, wherein the multiple segments are for a same level in a hierarchical representation of the L2P table.

3. The device of claim 2, wherein the same level of the hierarchical representation of the L2P table is segmented dynamically.

4. The device of claim 1, wherein a capacity of the byte-addressable memory to hold L2P mappings is less than two segments of the multiple segments.

5. The device of claim 4, wherein the controller is further configured to determine whether the request is for an address referred to by the first segment; and
wherein the controller is configured to replace the first segment with the second segment and fulfill the request further in accordance with a determination that the request is not for an address referred to by the first segment.

6. The device of claim 5, wherein the controller is configured to receive a preceding request prior to the request and prior to replacement of the first segment with the second segment in the byte-addressable memory; and
wherein the controller is configured to use the first segment to locate an address translation for the preceding request in accordance with a determination that the preceding request is for an address referred to by the first segment.

7. The device of claim 1, wherein, to determine whether the request is for the address referred to by the second segment of the multiple segments, the controller is configured to identify the second segment from the address via a predetermined constraint.

8. The device of claim 7, wherein the predetermined constraint includes a relationship between the multiple segments in the storage device.

9. The device of claim 8, wherein the relationship is an ordered assembly of the multiple segments in a contiguous area of the storage device.

10. The device of claim 7, wherein the predetermined constraint includes a pointer in the first segment to another segment of the multiple segments such that replacing the first segment with the second segment in the byte-addressable memory includes using the pointer to locate the second segment from the storage device, the second segment including a further pointer to a third segment which is loaded into the byte-addressable memory along with the second segment.

11. A method for memory translation table management, the method comprising:
loading, from a storage device to byte-addressable memory, a first segment of multiple segments of a logical-to-physical (L2P) translation table, wherein a bottom level of the L2P translation table includes a logical to physical address pairing for a portion of the storage device, and other levels of the L2P translation table include references within the L2P translation table;
receiving a request for an address translation;
determining whether the request is for an address referred to by a second segment of the multiple segments; and
in accordance with a determination that the request is for an address referred to by the second segment:
replacing the first segment with the second segment in the byte-addressable memory; and
fulfilling the request using the second segment to locate a lower level of the translation table that includes the address translation.

12. The method of claim 11, wherein the multiple segments are for a same level in a hierarchical representation of the L2P table.

13. The method of claim 12, wherein the same level of the hierarchical representation of the L2P table is segmented dynamically.

14. The method of claim 11, wherein a capacity of the byte-addressable memory to hold L2P mappings is less than two segments of the multiple segments.

15. The method of claim 14, comprising determining whether the request is for an address referred to by the first segment; and
wherein replacing the first segment with the second segment and fulfilling the request is further in accordance with a determination that the request is not for an address referred to by the first segment.

16. The method of claim 15, comprising:
receiving a preceding request prior to the request and prior to replacing the first segment with the second segment in the byte-addressable memory; and
using the first segment to locate an address translation for the preceding request in accordance with a determination that the preceding request is for an address referred to by the first segment.

17. The method of claim 11, wherein determining whether the request is for the address referred to by the second segment of the multiple segments includes identifying the second segment from the address via a predetermined constraint.

18. The method of claim 17, wherein the predetermined constraint includes a relationship between the multiple segments in the storage device.

19. The method of claim 18, wherein the relationship is an ordered assembly of the multiple segments in a contiguous area of the storage device.

20. The method of claim 17, wherein the predetermined constraint includes a pointer in the first segment to another segment of the multiple segments such that replacing the first segment with the second segment in the byte-addressable memory includes using the pointer to locate the second segment from the storage device, the second segment including a further pointer to a third segment which is loaded into the byte-addressable memory along with the second segment.

21. A non-transitory machine-readable medium including instructions for memory translation table management, the instructions, when executed by processing circuitry, cause the processing circuitry to perform operations comprising:
loading, from a storage device to byte-addressable memory, a first segment of multiple segments of a logical-to-physical (L2P) translation table, wherein a bottom level of the L2P translation table includes a logical to physical address pairing for a portion of the storage device, and other levels of the L2P translation table include references within the L2P translation table;
receiving a request for an address translation;

determining whether the request is for an address referred to by a second segment of the multiple segments; and in accordance with a determination that the request is for an address referred to by the second segment:

replacing the first segment with the second segment in the byte-addressable memory; and fulfilling the request using the second segment to locate a lower level of the L2P translation table that includes the address translation.

22. The non-transitory machine-readable medium of claim 21, wherein the multiple segments are for a same level in a hierarchical representation of the L2P table.

23. The non-transitory machine-readable medium of claim 22, wherein the same level of the hierarchical representation of the L2P table is segmented dynamically.

24. The non-transitory machine-readable medium of claim 21, wherein a capacity of the byte-addressable memory to hold L2P mappings is less than two segments of the multiple segments.

25. The non-transitory machine-readable medium of claim 24, wherein the operations comprise determining whether the request is for an address referred to by the first segment; and wherein replacing the first segment with the second segment and fulfilling the request is further in accordance with a determination that the request is not for an address referred to by the first segment.

26. The non-transitory machine-readable medium of claim 25, wherein the operations comprise:

receiving a preceding request prior to the request and prior to replacing the first segment with the second segment in the byte-addressable memory; and using the first segment to locate an address translation for the preceding request in accordance with a determination that, the preceding request is for an address referred to by the first segment.

27. The non-transitory machine-readable medium of claim 21, wherein determining whether the request is for the address referred to by the second segment of the multiple segments includes identifying the second segment from the address via a predetermined constraint.

28. The non-transitory machine-readable medium of claim 27, wherein the predetermined constraint includes a relationship between the multiple segments in the storage device.

29. The non-transitory machine-readable medium of claim 28, wherein the relationship is an ordered assembly of the multiple segments in a contiguous area of the storage device.

30. The non-transitory machine-readable medium of claim 27, wherein the predetermined constraint includes a pointer in the first segment to another segment of the multiple segments such that replacing the first segment with the second segment in the byte-addressable memory includes using the pointer to locate the second segment from the storage device, the second segment including a further pointer to a third segment which is loaded into the byte-addressable memory along with the second segment.

* * * * *